United States Patent
Orihashi et al.

(10) Patent No.: US 11,350,134 B2
(45) Date of Patent: May 31, 2022

(54) ENCODING APPARATUS, IMAGE INTERPOLATING APPARATUS AND ENCODING PROGRAM

(71) Applicant: NIPPON TELEGRAPH AND TELEPHONE CORPORATION, Tokyo (JP)

(72) Inventors: Shota Orihashi, Musashino (JP); Shinobu Kudo, Musashino (JP); Masaki Kitahara, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/057,006

(22) PCT Filed: May 9, 2019

(86) PCT No.: PCT/JP2019/018635
§ 371 (c)(1),
(2) Date: Nov. 19, 2020

(87) PCT Pub. No.: WO2019/225344
PCT Pub. Date: Nov. 28, 2019

(65) Prior Publication Data
US 2021/0112283 A1    Apr. 15, 2021

(30) Foreign Application Priority Data
May 21, 2018    (JP) .............................. JP2018-097426

(51) Int. Cl.
*H04N 19/85*    (2014.01)
*H04N 19/167*   (2014.01)
(Continued)

(52) U.S. Cl.
CPC ............ *H04N 19/85* (2014.11); *H04N 19/132* (2014.11); *H04N 19/167* (2014.11); *H04N 19/17* (2014.11);
(Continued)

(58) Field of Classification Search
CPC .... H04N 19/85; H04N 19/167; H04N 19/463; H04N 19/17; H04N 19/132; H04N 19/393
See application file for complete search history.

(56) References Cited

U.S. PATENT DOCUMENTS

2003/0128882 A1*  7/2003  Kim .................... H04N 19/154
                                                     382/238
2009/0110241 A1*  4/2009  Takemoto ............ H04N 13/207
                                                     382/103
(Continued)

FOREIGN PATENT DOCUMENTS

WO    WO 2017183479 A1    11/2019

OTHER PUBLICATIONS

Bastian Wandt et al. "Extending HEVC Using Texture Synthesis", IEEE Visual Communications and Image Processing. Dec. 10, 2017.
(Continued)

*Primary Examiner* — Zaihan Jiang

(57) ABSTRACT

A coding device of the present invention for coding an image includes: a region acquiring unit configured to acquire a region of a first image that matches a predetermined condition; an image acquiring unit configured to obtain a second image by associating the first image, the acquired region, and a region obtained by removing the acquired region from the first image with each other; and a coding unit configured to code the second image. Also, an image interpolation system of the present invention for interpolating a first
(Continued)

image includes: an acquiring unit configured to acquire the first image and auxiliary information by associating a second image, a matching region of the second image that matches a predetermined condition, and a region obtained by removing the matching region from the second image with each other; and an interpolating unit configured to interpolate the first image using the auxiliary information, and obtain an image that approximates the second image. With the present invention, it is possible to execute image interpolation processing while suppressing degradation of the subjective image quality.

8 Claims, 18 Drawing Sheets

(51) Int. Cl.
*H04N 19/17* (2014.01)
*H04N 19/463* (2014.01)
*H04N 19/593* (2014.01)
*H04N 19/132* (2014.01)

(52) U.S. Cl.
CPC ......... *H04N 19/463* (2014.11); *H04N 19/593* (2014.11)

(56) References Cited

U.S. PATENT DOCUMENTS

| | | | |
|---|---|---|---|
| 2011/0170615 A1* | 7/2011 | Vo | H04N 19/85 375/E7.076 |
| 2014/0281012 A1* | 9/2014 | Troxler | H04L 65/604 709/231 |
| 2016/0275708 A1* | 9/2016 | Abdollahian | G06T 11/60 |
| 2017/0147867 A1* | 5/2017 | Pradeep | G06T 11/60 |
| 2017/0188002 A1* | 6/2017 | Chan | G06V 10/28 |
| 2017/0262970 A1* | 9/2017 | Chen | G06T 5/00 |
| 2018/0042468 A1* | 2/2018 | Teramura | G06T 7/0012 |
| 2018/0300937 A1* | 10/2018 | Chien | G06T 7/194 |
| 2019/0051039 A1* | 2/2019 | Tsuru | G06T 15/80 |
| 2019/0132589 A1 | 5/2019 | Chida et al. | |
| 2020/0120276 A1* | 4/2020 | Kim | G06T 3/4007 |

OTHER PUBLICATIONS

Satoshi Iizuka et al., Globally and Locally Consistent Image Completion, ACM Transactions on Graphics, vol. 36, No. 4, Article 107, pp. 1-14, Jul. 2017.

* cited by examiner

ENCODING APPARATUS, IMAGE INTERPOLATING APPARATUS AND ENCODING PROGRAM

CROSS-REFERENCE TO RELATED APPLICATIONS

This application is a 371 U.S. National Phase of International Application No. PCT/JP2019/018635, filed on May 9, 2019, which claims priority to Japanese Application No. 2018-097426 filed on May 21, 2018. The entire disclosures of the above applications are incorporated herein by reference.

TECHNICAL FIELD

The present invention relates to a coding device, an image interpolation system, and a coding program.

BACKGROUND ART

MPEG-4, H.264/AVC, and H.265/HEVC (hereinafter, referred to as "HEVC") are known as standards for compression-coding video data. Also, new standards after HEVC have also come under review. These video compression coding standards employ a predictive coding method in which an image is processed in terms of rectangular blocks into which the image is divided, pixel values of a prediction target block are predicted with reference to a prediction block adjacent to the prediction target block, and only prediction residual signals are transmitted. The following will describe an intra predictive coding method in which an image is enclosed within a frame and pixel signals are predicted, taking HEVC as an example.

In HEVC, as shown in FIG. 17, an entire picture plane is divided into blocks of 64 pixels×64 pixels (hereinafter, referred to as "64×64"), and the units are each defined as a Coding Tree Unit (CTU). Each CTU can be divided into four squares, called Coding Units (CU), which are processed recursively so as to be divided into small blocks. In HEVC, CUs of four types of sizes, namely, 64×64, 32×32, 16×16, and 8×8, can be used, and prediction processing is performed in terms of units, called Prediction Units (PU) obtained by further dividing each CU.

In the Intra prediction, two types of PUs, namely, PUs obtained by dividing a CU into four and PUs obtained otherwise, can be used. Thirty five types of prediction parameters can selectively be applied to each PU, and, for example, a prediction parameter for which a prediction residual signal with respect to an original image is minimum is selected on the coding side, and the prediction parameter and the prediction residual signal are transmitted to the decoding side.

In HEVC, one of three types of prediction methods, namely, Planar prediction, Direct Current (DC) component prediction, and directional prediction, can be selected. Because thirty three prediction parameters are assigned to the directional prediction, the total number of prediction parameters is equal to thirty five. The prediction methods are such that, as shown in FIG. 18, pixel values of reference pixels located on the left and upper sides of a prediction target block are used to perform prediction. In the directional prediction, prediction pixels of the prediction target block are each generated by selecting one of the defined thirty three directions as a reference direction, and assigning the pixel value of the reference direction to a reference block. In the Planar prediction, four pixels, namely, the lower left and upper right pixels of the prediction target block, and the pixels leftward and upward adjacent to each prediction target pixel within the prediction target block, are referenced, and the prediction target pixel is predicted as a weighed mean of the four pixels.

In the DC prediction, a single prediction value of the prediction target block is generated as an average of reference pixels located on the left and upper side of the prediction target block.

In this way, in the above-described prediction methods, referenceable pixels are referenced and prediction is performed based on a simple prediction rule as described above, but there is the problem that the prediction efficiency may be impaired for an image in which high-frequency components are distributed within its picture plane, for example. As a method for realizing compression coding in which, when performed even on such an image, the subjective quality thereof is maintained and the amount of coding is reduced, a method that employs a processing method for artificially reconfiguring an image is conceivable.

According to the technique described in NPL 1, two networks, namely, an interpolation network constituted by a convolution neural network, and a discriminative network for discriminating an interpolated image configured by the convolution neural network and interpolated by the interpolation network, from a non-interpolated authentic image, are trained alternately along the line of the framework of a generative adversarial network. Accordingly, the interpolation network can artificially reconstruct a missing region of the image.

CITATION LIST

[Non Patent Literature]
  [NPL 1] S. Iizuka, E. Simo-Serra, H. Ishikawa, "Globally and Locally Consistent Image Completion", ACM Transactions on Graphics, Vol. 36, No. 4, July 2017

SUMMARY OF THE INVENTION

Technical Problem

However, in the configuration according to the technique described in NPL 1, the larger the area a missing region to be interpolated has, the smaller the amount of information to be input to the interpolation network is, and thus it is difficult to estimate the missing region in the image interpolation processing, resulting in that an output image has a degraded subjective image quality. Furthermore, in the above-described configuration, if a missing region to be interpolated includes a complicated element that cannot be estimated based on a referenceable region, an output image has a degraded subjective image quality.

In view of the above-described circumstances, an object of the present invention is to provide a technique that can execute image interpolation processing while suppressing degradation of the subjective image quality.

Means for Solving the Problem

An aspect of the present invention relates to a coding device for coding an image that includes: a region acquiring unit configured to acquire a region of a first image that matches a predetermined condition; an image acquiring unit configured to acquire a second image by associating the first image, the acquired region, and a region obtained by removing the acquired region from the first image with each other; and a coding unit configured to code the second image.

Furthermore, according to an aspect of the present invention, the above-described coding device further includes: an auxiliary information extraction network configured to receive inputs of the first image and the acquired region, and output auxiliary information, which is information for assisting image interpolation; an auxiliary information reference network configured to receive an input of the auxiliary information, and output a first intermediate image generated with reference to the auxiliary information; a missing image reference network configured to receive inputs of the acquired region and the region obtained by removing the acquired region, and output a second intermediate image generated with reference to a missing image; and a reconfiguration network configured to receive inputs of the first intermediate image and the second intermediate image, and output the second image.

Furthermore, according to an aspect of the present invention, the above-described coding device further includes: an auxiliary information extraction network configured to receive inputs of a difference image between the first image and a second intermediate image output from a missing image reference network, and the acquired region, and output auxiliary information, which is information for assisting image interpolation; an auxiliary information reference network configured to receive an input of the auxiliary information, and output a first intermediate image generated with reference to the auxiliary information; the missing image reference network configured to receive inputs of the acquired region, and the region obtained by removing the acquired region, and output the second intermediate image generated with reference to a missing image; and a reconfiguration network configured to receive inputs of the first intermediate image and the second intermediate image, and output the second image.

Furthermore, according to an aspect of the present invention, the above-described coding device is such that the missing image reference network learns learning parameters for the second intermediate image so that a pixel difference between the second intermediate image and the first image is minimized.

Furthermore, according to an aspect of the present invention, the above-described coding device is such that the auxiliary information extraction network learns learning parameters for the auxiliary information so that a pixel difference between the first intermediate image output from the auxiliary information reference network and the first image is minimized.

Furthermore, according to an aspect of the present invention, the above-described coding device is such that the auxiliary information reference network learns learning parameters for the first intermediate image so that a pixel difference between the first intermediate image and the first image is minimized.

Furthermore, an aspect of the present invention relates to an image interpolation system for interpolating a first image that includes: an acquiring unit configured to acquire the first image and auxiliary information by associating a second image, a matching region of the second image that matches a predetermined condition, and a region obtained by removing the matching region from the second image with each other; and an interpolating unit configured to interpolate the first image using the auxiliary information, and obtain an image that approximates the second image.

Furthermore, an aspect of the present invention relates to a coding program for causing a computer to function as the above-described coding device.

Effects of the Invention

Accordingly to the present invention, it is possible to execute image interpolation processing while suppressing degradation of the subjective image quality.

DESCRIPTION OF EMBODIMENTS

Hereinafter, embodiments of the present invention will be described, taking an example in which HEVC is used together with intra predictive coding, but the present invention is not limited to HEVC and intra prediction. In other words, the present invention is also applicable to an image coding method and intra prediction using a standard other than HEVC.

The coding device according to the present invention is such that it is determined whether each of blocks of CTUs, CUs, or the like of HEVC is a block to be reconfigured or a block not to be reconfigured on the coding side, and auxiliary information is extracted from the block that is determined as being a block to be reconfigured (hereinafter, referred to as "reconfiguration target block") and is transmitted. Here, "reconfiguration" means processing for generating an artificial image that matches a focus region of an image using texture synthesis, image interpolation synthesis processing, or the like. Note that "artificial image" in this context refers to, for example, an image that hardly appears to be different from an input image in the subjective view.

Furthermore, the coding device performs uniform image processing over the entire reconfiguration target block so that there is a small amount of information relating to a prediction residual in HEVC intra prediction, and then inputs the processed block to an HEVC coder. In other words, the coding device is configured to reduce the coding amount required for coding an image while maintaining a desired quality of the image. To this end, the coding device regards, as a reconfiguration target block, a block that is inaccurately predicted in HEVC, or a block of a subject whose image pixels before coding does not need to be reproduced accurately as long as a certain degree of accuracy in subjective image quality can be ensured, so that the block is constituted by pixels that can easily be predicted using HEVC. A decoding device determines a reconfiguration target block, by determining whether or not uniform image processing was performed on the entire reconfiguration target block.

First Embodiment

The following will describe a first embodiment with reference to the drawings.
[Processing Performed by Coding Device]
First, processing of the coding device according to the present invention will be described.

Figure 1:
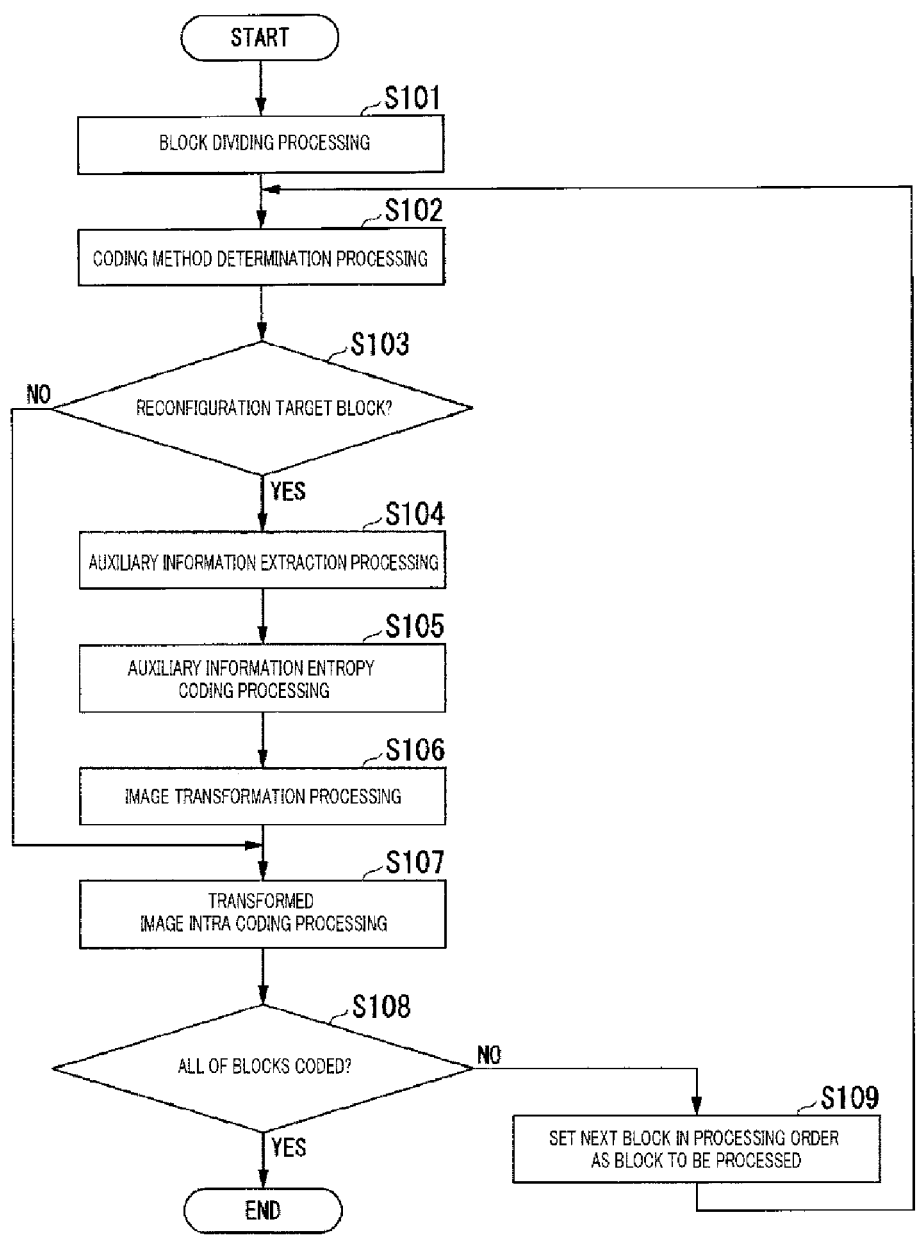
FIG. 1 is a flowchart showing a flow of processing performed by a coding device 10 according to a first embodiment.

FIG. 1 shows a flow of processing performed by a coding device according to a first embodiment of the present invention.

Figure 17:
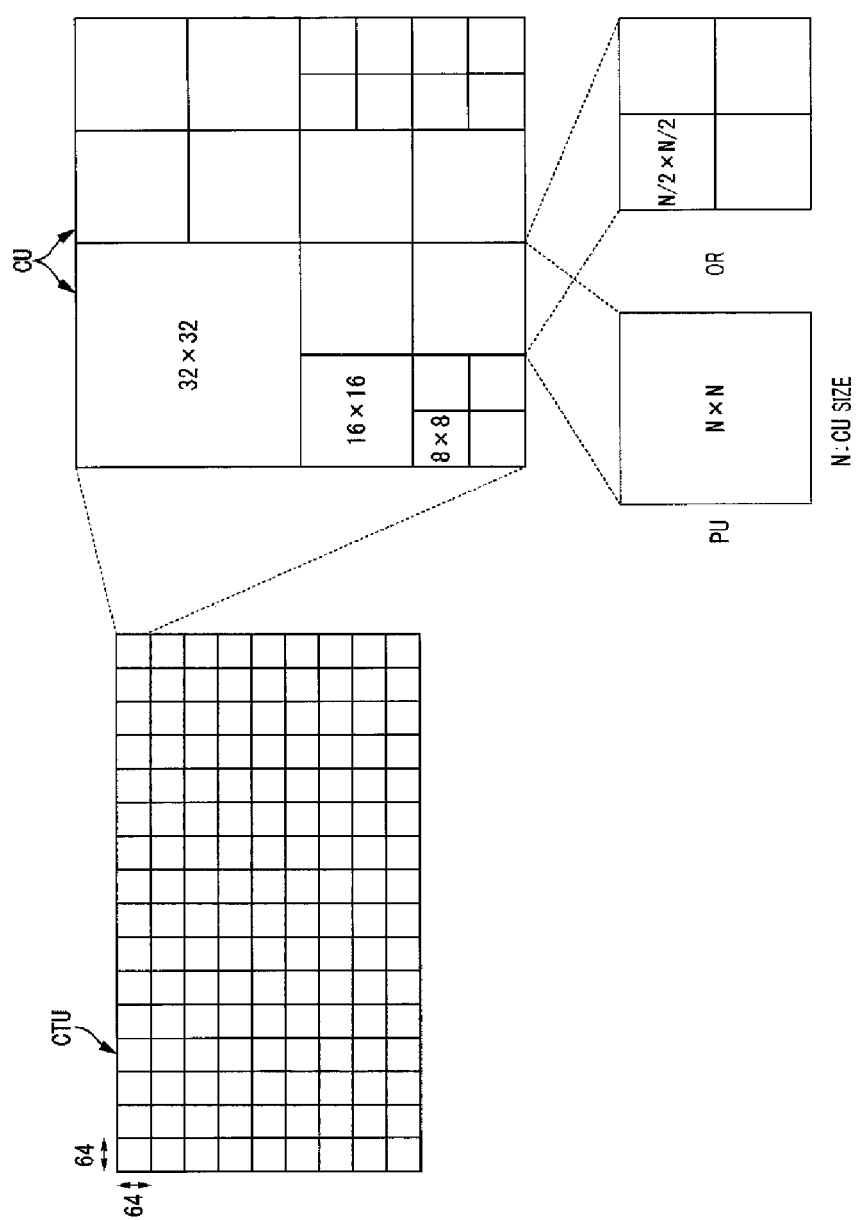
FIG. 17 is a schematic diagram for illustrating a configuration of block division of intra-picture plane prediction in HEVC.
Figure 18:
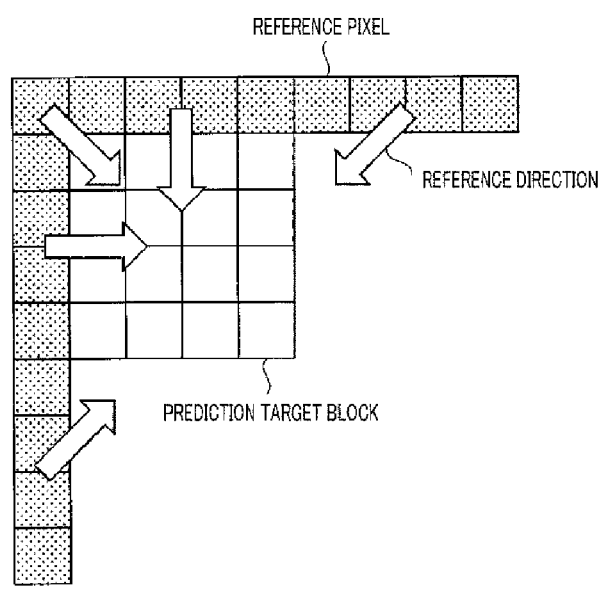
FIG. 18 is a schematic diagram for illustrating a configuration of intra prediction in HEVC.

In block dividing processing, the shape of a block to be subjected to coding processing is determined based on an input picture (step S101). The shape of the divided block to be output conforms to that of the CTUs, CUs, and PUs as shown in FIG. 17, and the block dividing processing is performed using the block as a unit of reconfiguration processing and HEVC coding processing that are performed on the decoding side.

As the method for determining the divided shape, any of the following methods can be used, namely, a method for determining a uniform rectangle as used in CTUs as the divided shape, a method for determining the shape into which a CU is divided by rate distortion optimization as implemented on a HEVC Test Model (HM) as the divided shape, a method for determining a result obtained by executing region division on each object used in image recognition in terms of a block as an approximate shape, and the like.

In coding method determination processing, it is determined whether each of the blocks obtained through the division in the block dividing processing is set as a reconfiguration target block, or a non-reconfiguration target block (step S102). Note that, as the determination method, a determination method may be used such that the estimated amount of coding that occurs and the estimated amount of distortion are obtained, and rate distortion optimization is applied, for each of cases where the block is set as the reconfiguration target block, and where the block is set as the non-reconfiguration target block, for example.

If it is determined that the block is set as a reconfiguration target block (Yes in step S103), the coding device performs auxiliary information extraction processing to extract, from the reconfiguration target block, auxiliary information that is to be transmitted to a decoding device and is used to assist reconfiguration processing (step S104). "Reconfiguration processing" refers to processing for inversely transforming, on the decoding side, a block obtained by subjecting a reconfiguration target block to any transformation as described later. In the auxiliary information extraction processing, when, for example, a reconfiguration target block is reconfigured by image synthesis, a label identifying a representative texture or object to be used during the synthesis, or the like is extracted as auxiliary information.

The extracted auxiliary information is entropy-coded through auxiliary information entropy coding processing, and as a result, coded data of the auxiliary information is obtained. Note that, as the auxiliary information entropy coding processing, any coding method may be used such as, for example, the Huffman coding method or the run-length coding method (step S105).

The reconfiguration target block from which the auxiliary information has been extracted is transformed, through image transformation processing, into an image that can be transmitted with a smaller amount of coding by HEVC (step S106). Note that, in the image transformation processing, the coding device may replace, for example, the reconfiguration target block with an average of the block, or may perform transformation such that a prediction residual predicted using an arbitrary or specific mode count in HEVC intra directional prediction is asymptotic to zero.

Furthermore, the coding device may transmit the mode count of the HEVC intra prediction that was used for the transformation, as part of the auxiliary information, to the decoding side, that is, the coding device may perform image transformation with a specific mode count of the HEVC intra prediction associated with a reconfiguration processing on the decoding side, and may transmit the association relation, as part of the auxiliary information, to the decoding side.

For example, when the texture synthesis is used as the reconfiguration processing, the coding device may also associate an intra prediction mode count with a representative texture, and may transmit the association relation, as auxiliary information, to the decoding side. Furthermore, the image transformation method may also be a method other than transformation based on HEVC intra prediction. The coding device may select a suitable transformation method that can obtain an output that is not present in an input picture, from those defined or predetermined in the course of the image transformation processing, and may transmit the selected transformation method, as auxiliary information, to the decoding side.

The coding device codes the transformed image (hereinafter, referred to as "transformed image") through transformed image intra coding processing, and obtains coded data of the transformed image (step S107).

The coding device performs the above-described processing on all of the blocks in the processing order (steps S108 and S109), and obtains coded data of the auxiliary information and the coded data of the transformed image, the pieces of coded data serving as information to be transmitted.

[Example of Configuration of Coding Device]

The following will describe an example of the coding device for realizing the above-described processing.

Figure 2:
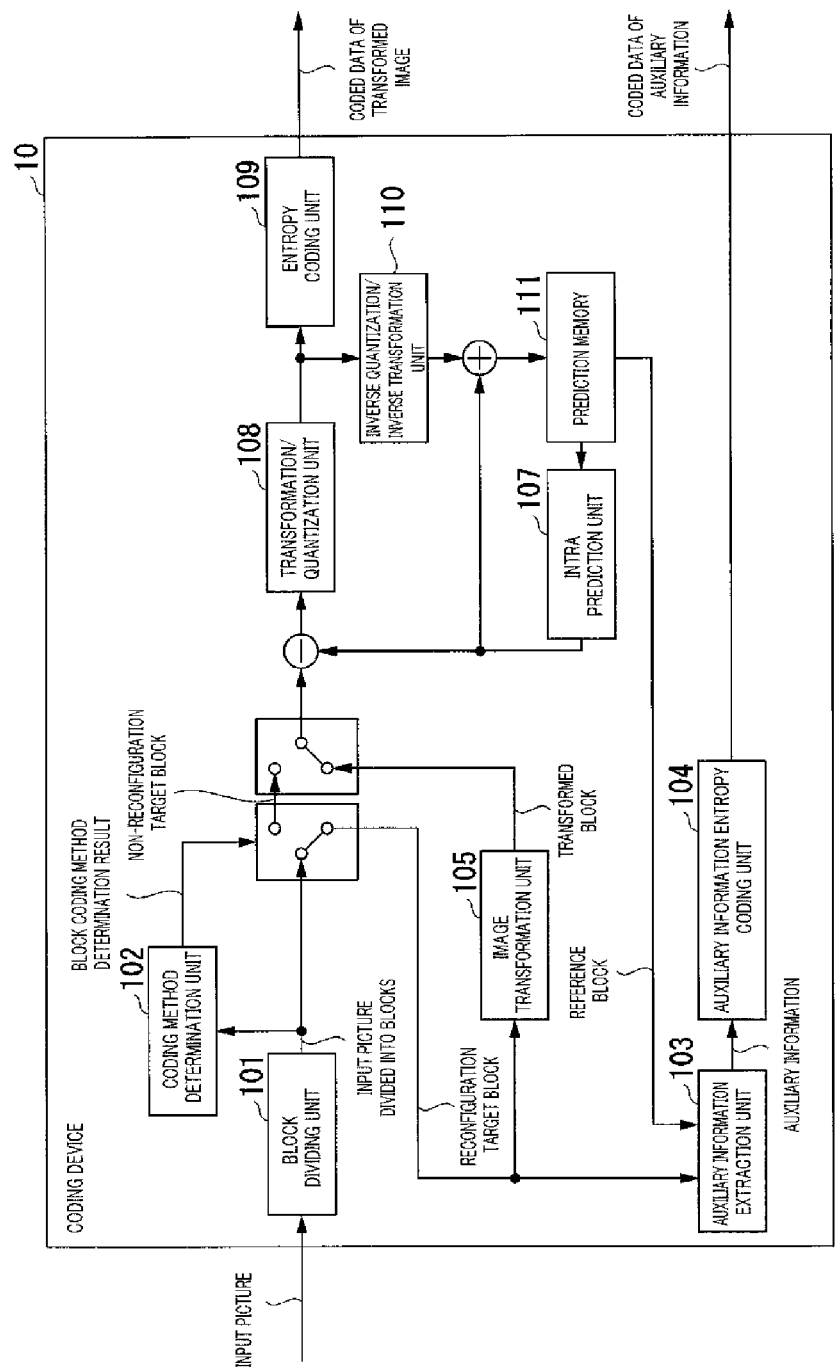
FIG. 2 is a block diagram showing a functional configuration of the coding device 10 according to the first embodiment.

FIG. 2 shows an example of a configuration of a coding device 10 according to the first embodiment. As shown in FIG. 2, the coding device 10 includes a block dividing unit 101, a coding method determination unit 102, an auxiliary information extraction unit 103, an auxiliary information entropy coding unit 104, an image transformation unit 105, an intra prediction unit 107, a transformation/quantization unit 108, an entropy coding unit 109, an inverse quantization/inverse transformation unit 110, and a prediction memory 111.

The block dividing unit 101 performs block dividing processing upon input of an input picture. The block dividing unit 101 outputs the input picture divided into blocks.

The coding method determination unit 102 performs coding method determination processing upon input of the input picture divided into blocks. The coding method determination unit 102 outputs a result of block coding method determination.

The auxiliary information extraction unit 103 performs auxiliary information extraction processing upon input of a reconfiguration target block and a reference block. The reference block is a block that includes a pixel to be referenced in reconfiguration processing, namely, a block that includes, if, for example, image interpolation synthesis is used as the reconfiguration processing, a pixel to be referenced in interpolation processing. The auxiliary information extraction unit 103 outputs auxiliary information.

The auxiliary information entropy coding unit 104 performs entropy coding on the input auxiliary information, and obtains coded data of the auxiliary information. The auxiliary information entropy coding unit 104 outputs the coded data of the auxiliary information.

The image transformation unit 105 performs image transformation processing upon input of the reconfiguration target block. The image transformation unit 105 outputs the transformed block.

The transformed block and a non-reconfiguration target block are coded through intra coding. In the intra coding, a prediction residual with respect to a predicted image output from the intra prediction unit 107 is orthogonally transformed and quantized by the transformation/quantization unit 108, and is coded by the entropy coding unit 109. Accordingly, coded data of the image is obtained.

Note that the present embodiment employs a configuration in which the entropy coding unit 109 for coding a prediction residual and the auxiliary information entropy coding unit 104 for coding auxiliary information are separate functional blocks, but they may be formed as a single functional block. In other words, a configuration is also possible in which a single coding unit codes a prediction residual and auxiliary information using, for example, a common entropy coding method.

The prediction residual quantized by the transformation/quantization unit 108 is inverse quantized and inverse transformed by the inverse quantization/inverse transformation unit 110, and is stored in the prediction memory 111. The data stored in the prediction memory 111 is used in the intra prediction processing performed by the intra prediction unit 107, and in the auxiliary information extraction processing performed by the auxiliary information extraction unit 103.

[Processing of Decoding Device]

The following will describe processing performed by the decoding device in which the coded data generated by the above-described processing and the functional configurations is decoded into an image.

Figure 3:
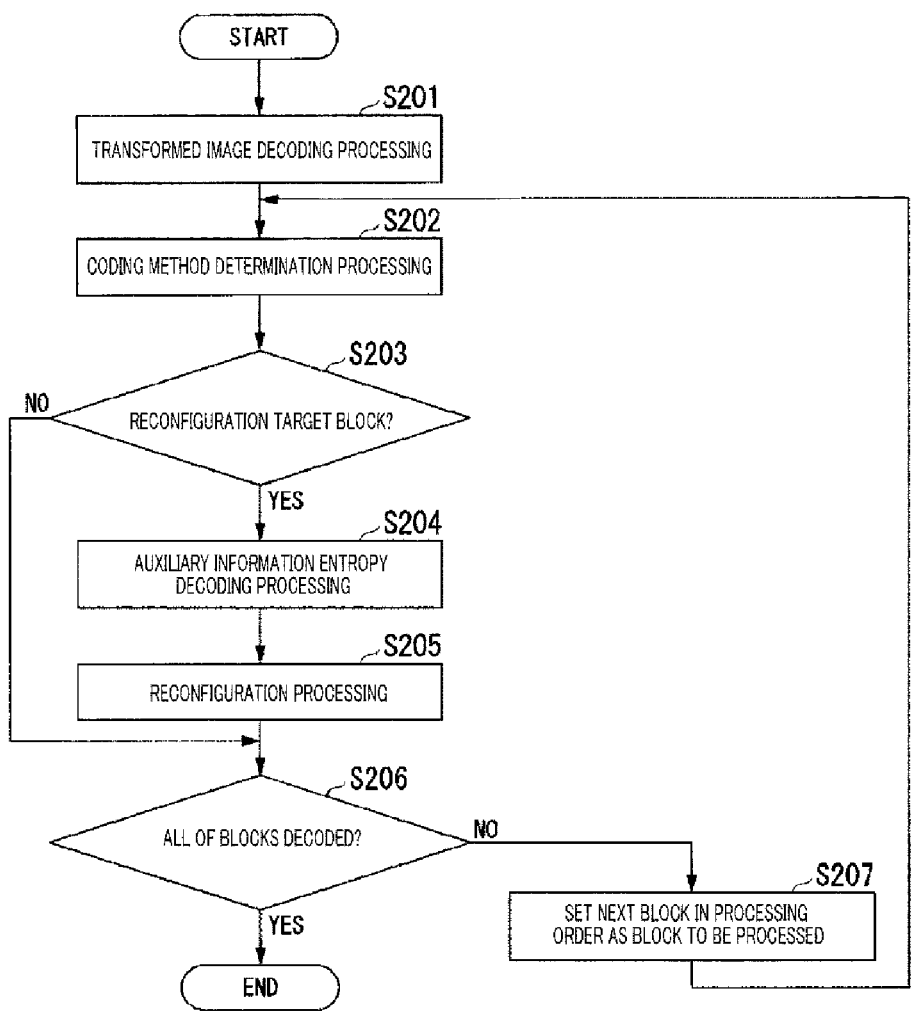
FIG. 3 is a flowchart showing a flow of processing performed by a decoding device 20 according to the first embodiment.

FIG. 3 shows a flow of processing performed by the decoding device according to the first embodiment.

In transformed image decoding processing, the coded data of the transformed image is decoded, and blocks of a decoded image of the transformed image are obtained (step S201). Note that the decoded image may be a unit image corresponding to the input image, or a unit image corresponding to the blocks into which the input image is divided. In the following processing, description will be given assuming that the decoded image is a unit image corresponding to the blocks.

In coding method determination processing, the block transformed through an image transformation method used by the image transformation unit 105 of the coding device 10 is determined as a reconfiguration target block (step S202). For example, if the image transformation unit 105 of the coding device 10 performs processing for uniformly replacing the reconfiguration target block with an average, a block obtained by performing the above-described processing on the block obtained from the decoded image of the transformed image is determined as a reconfiguration target block in the coding method determination processing.

If a block is determined as a reconfiguration target block (Yes in step S203), in coding method determination processing, coded data of the auxiliary information that corresponds to this reconfiguration target block is decoded using the coding method applied by the auxiliary information entropy coding unit 104 of the coding device 10 (step S204).

In reconfiguration processing, upon input of the auxiliary information and a reference block to be referenced for the reconfiguration target block, reconfiguration processing is performed (step S205).

The above-described processing is applied to all of the blocks in the order of the processing (steps S206 and S207), and obtains an ultimate decoded image.

[Example of Configuration of Decoding Device]

The following will describe an example of a configuration of the decoding device for realizing the above-described processing.

Figure 4:
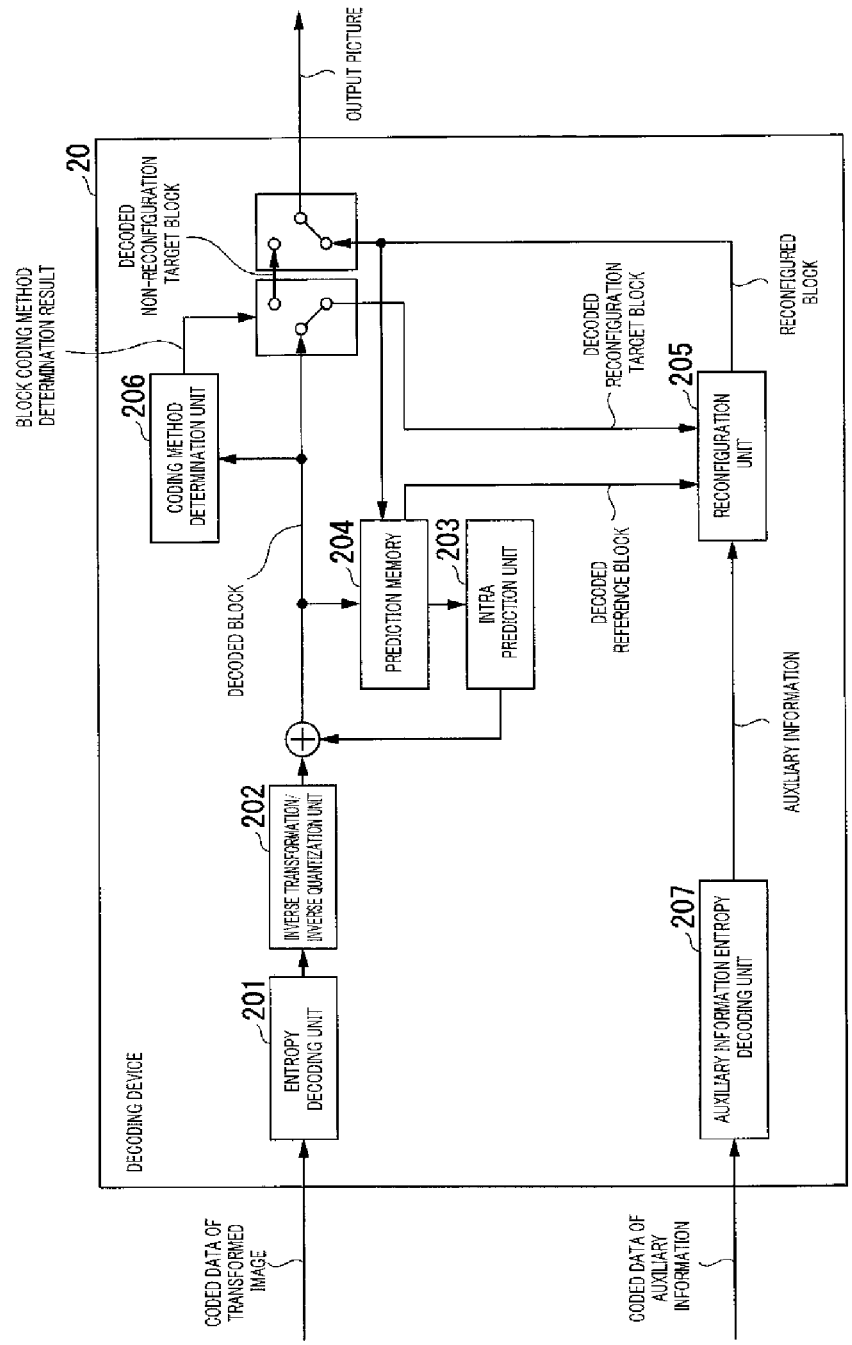
FIG. 4 is a block diagram showing the functional configuration of the decoding device 20 according to the first embodiment.

FIG. 4 shows an example of a configuration of a decoding device 20 according to the first embodiment. As shown in FIG. 4, the decoding device 20 includes an entropy decoding unit 201, an inverse transformation/inverse quantization unit 202, an intra prediction unit 203, a prediction memory 204, a reconfiguration unit 205, a coding method determination unit 206, and an auxiliary information entropy decoding unit 207.

The coded data of the transformed image is decoded by HEVC. In the decoding by HEVC, first, the coded data of the transformed image is entropy-decoded by the entropy decoding unit 201, and is subjected to inverse transformation and inverse quantization by the inverse transformation/inverse quantization unit 202. Accordingly, a prediction residual image is decoded, and a result of prediction performed by the intra prediction unit 203 is added thereto, so that a block of the decoded image of the transformed image is obtained.

The decoded transformed image is stored in the prediction memory 204, and is used as an input to the intra prediction unit 203 and the reconfiguration unit 205.

The coding method determination unit 206 performs coding method determination processing upon input of the block of the decoded image of the transformed image, and outputs a result of the determination.

The auxiliary information entropy decoding unit 207 performs entropy decoding on the input coded data of the auxiliary information, and obtains the auxiliary information. The auxiliary information entropy decoding unit 207 outputs the auxiliary information to the reconfiguration unit 205.

The reconfiguration unit 205 performs reconfiguration processing upon input of the auxiliary information, a reference pixel to be reference for the reconfiguration target block, and the reconfiguration target block, and outputs an ultimate output picture.

As described above, the coding method and the decoding method according to the above-described embodiment differ from those of the conventional technique, and are such that an input image is classified as to whether it is to be reconfigured or not to be reconfigured in terms of a processing block, and reconfiguration processing is applied thereto. The coding method and the decoding method according to the above-described embodiment can be restricted to being performed in terms of blocks, thus achieving a reduction in the coding amount when boundary information is transmitted. The coding method and the decoding method according to the above-described embodiment can realize identification of a position of a reconfiguration target block without transmitting boundary information, as a result of, for example, the coding device 10 and the decoding device 20 sharing the rule of replacing a reconfiguration target block with an average.

In conventional coding methods and decoding methods, any shape of a reconfiguration target can be designated, whereas it is necessary to transmit, for each region, information as to whether or not it is a reconfiguration target and a reconfiguration method, as auxiliary information, to the decoding side. Accordingly, in the conventional methods, there is the problem that the coding amount of the auxiliary information increases. In contrast, in the coding method and the decoding method according to the above-described embodiment, a reconfiguration target block is designated in terms of a block, and the designated reconfiguration target block is subjected to, on the coding side, processing for enabling coding with HEVC with a smaller amount (for example, processing for replacing the entire block with an average), and, on the decoding side, to processing for determining whether or not this processing has been performed. Accordingly, in the coding method and the decoding method according to the above-described embodiment, it is possible to determine a reconfiguration block on the decoding side without transmitting boundary information as auxiliary information to the decoding side. Furthermore, by associating a HEVC mode count with a reconfiguration method, the reconfiguration method can also be transmitted at the same time to the decoding side.

Second Embodiment

The following will describe a second embodiment with reference to the drawings. The second embodiment described below differs from the above-described first embodiment in the configurations of a coding device and a decoding device.

[Example of Configuration of Coding Device]

Figure 5:
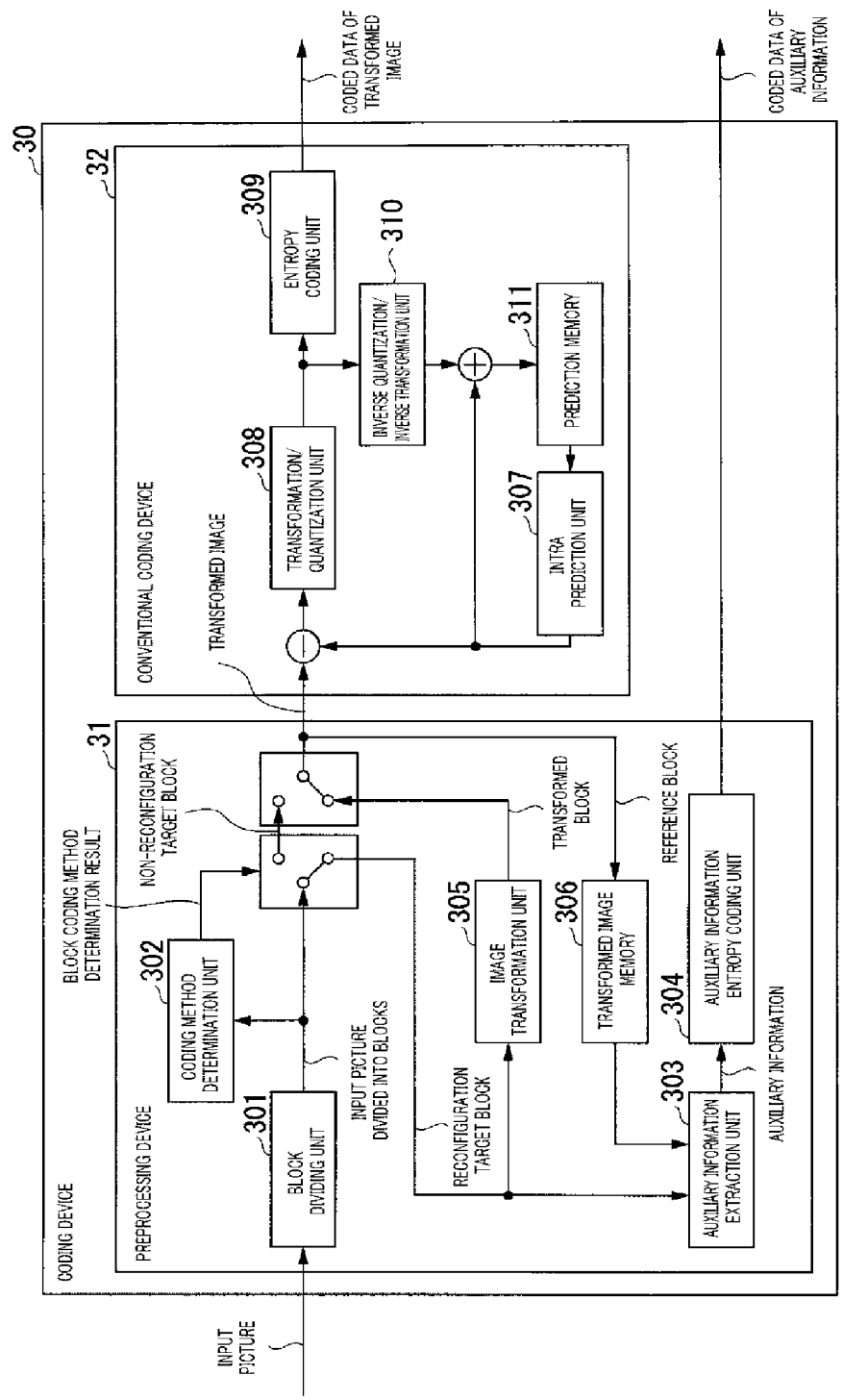
FIG. 5 is a block diagram showing a functional configuration of a coding device 30 according to a second embodiment.

A configuration of a coding device 30 according to the second embodiment is shown in FIG. 5. As shown in FIG. 5, the coding device 30 includes a preprocessing device 31 and a conventional coding device 32. The preprocessing device 31 includes a block dividing unit 301, a coding method determination unit 302, an auxiliary information extraction unit 303, an auxiliary information entropy coding unit 304, an image transformation unit 305, and a transformed image memory 306. The conventional coding device 32 includes an intra prediction unit 307, a transformation/quantization unit 308, an entropy coding unit 309, an inverse quantization/inverse transformation unit 310, and a prediction memory 311.

As shown in FIG. 5, the coding device 30 of the second embodiment differs from the coding device 10 of the first embodiment in that the preprocessing device 31 is provided with the block dividing unit, the coding method determination unit, the image transformation unit, the auxiliary information extraction unit, and the entropy coding unit, and is independent from other components (that is, the components of the conventional coding device).

In this case, as in the configuration shown in FIG. 5, a configuration is also possible in which a transformed image is stored in the transformed image memory 306, and the auxiliary information extraction unit 303 references the transformed image stored in the transformed image memory 306. The components other than the components included in the preprocessing device 31 are configured separately as the conventional coding device 32. As the conventional coding device 32, a HEVC intra coding device, or a coding device that conforms to an image coding standard such as the Joint Photographic Experts Group (JPEG) can be used, for example.

Note that a processing flow of the coding device 30 is the same as the processing flow shown in FIG. 1, and thus description thereof is omitted.

[Example of Configuration of Decoding Device]

Figure 6:
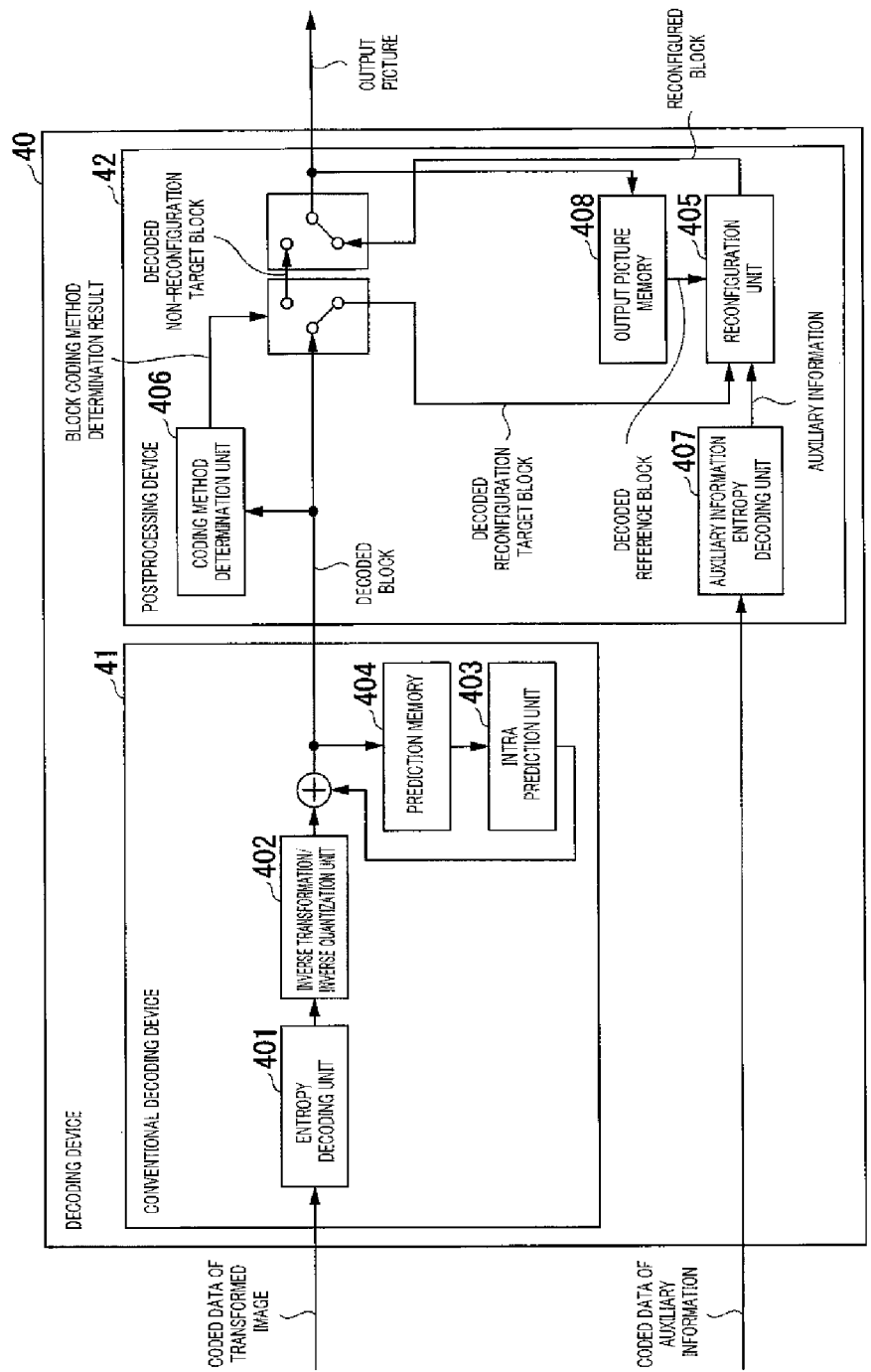
FIG. 6 is a block diagram showing a functional configuration of a decoding device 40 according to the second embodiment.

In the following, a configuration of a decoding device 40 according to the second embodiment is shown in FIG. 6. As shown in FIG. 6, the decoding device 40 is constituted by a conventional decoding device 41 and a postprocessing device 42. The conventional decoding device 41 includes an entropy decoding unit 401, an inverse transformation/inverse quantization unit 402, an intra prediction unit 403, and a prediction memory 404. The postprocessing device 42 includes a reconfiguration unit 405, a coding method determination unit 406, and an auxiliary information entropy decoding unit 407.

As shown in FIG. 6, the decoding device 40 of the second embodiment differs from the decoding device 20 of the first embodiment in that the postprocessing device 42 is provided with the coding method determination unit, the auxiliary information entropy decoding unit, and the reconfiguration unit, and is independent from other components (that is, the components of the conventional coding device).

In this case, as in the configuration shown in FIG. 6, a configuration is also possible in which an output picture is stored in an output picture memory 408, and the reconfiguration unit 405 references the output picture stored in the output picture memory 408. The components other than the components included in the postprocessing device 42 are configured separately as the conventional decoding device 41.

Note that a flow of the decoding device 40 is the same as the processing flow shown in FIG. 3, and thus description thereof is omitted.

According to the coding method and the decoding method of the above-described second embodiment, it is possible to realize the preprocessing device 31 and the postprocessing device 42 that can be used together with a conventional coding device and a conventional decoding device, respectively. Accordingly, in the combination of the standard, and the preprocessing device 31 as well as the postprocessing device 42, the coding efficiency is additively improved, and thus according to the coding method and the decoding method according to the second embodiment, when the coding device according to the standard has a high efficiency, the coding efficiency of the entire coding device 30 can be improved.

The following will describe a means for reconfiguring a reconfiguration target block on the decoding side with image interpolation synthesis processing using machine learning. Of course, this means can also be used in the first and second embodiments.

Third Embodiment

Hereinafter, a third embodiment will be described with reference to the drawings.

As described above, in the prediction methods (Planar prediction, DC prediction, and directional prediction) that are selectable in HEVC, referenceable pixels are referenced, and prediction is performed based on a simple prediction rule. However, in these prediction methods, there is the problem that the prediction efficiency is impaired for an image in which, for example, high-frequency components are distributed in a random manner within a picture plane. In such an image, the amount of information relating to a prediction residual signal is large, and thus, if coding is performed assuming that the prediction residual signal has a constant quantization level, the amount of coding will be too large.

As the method for realizing, also for such an image, compression coding that reduces the coding amount while maintaining the subjective quality thereof, a method that employs a processing method for artificially reconfiguring an image in addition to increasing the accuracy of a prediction method is conceivable, in contrast to the above-described prediction.

According to the technique described in NPL 1 (hereinafter, referred to as "conventional technique 1"), the interpolation network can artificially reconfigure a missing region of an image, by alternately training the below described two neural networks along the line of the framework of a generative adversarial network. Here, the two neural networks refer to the interpolation network constituted by a convolution neural network, and the discriminative network for discriminating an interpolated image configured by the convolution neural network and interpolated by the interpolation network, from a non-interpolated authentic image.

In the third embodiment according to the present invention, the interpolation network of the conventional technique 1 is applied to the decoding side, so that the above-described region of an image for which the prediction efficiency is reduced can be reconfigured into an image on the decoding side, which eliminates a need of transmitting the region to be reconfigured and makes it possible to reduce the amount of coding.

[Example of Image Coding and Decoding Processing Using Interpolation Network]

Figure 7:
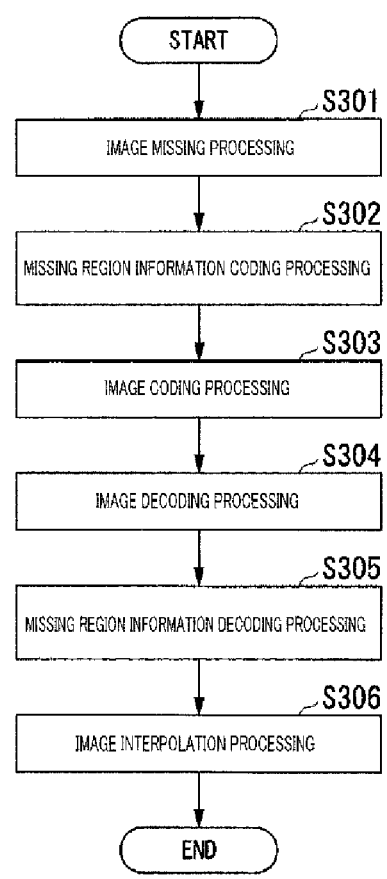
FIG. 7 is a flowchart showing a flow of processing performed by a coding device 50 and a decoding device 60 according to a conventional technique.

An example of image coding and decoding processing using the interpolation network is shown in FIG. 7.

In image missing processing, a region to be reconfigured through image interpolation on the decoding side is selected from an input image, and is rendered missing so that a missing image is generated, and the generated missing image is output together with missing region information that indicates the missing region (step S301). Here, the missing region information is, for example, a binary image indicating the missing region.

In missing region information coding processing, processing for coding the missing region information in order to transmit the missing region information to the decoding side is performed using a conventional image coding method such as the Joint Photographic Experts Group (JPEG) or HEVC, or an entropy coding method such as the run-length coding method. Accordingly, in the missing region information coding processing, coded data of the missing region information is obtained (step S302).

In image coding processing, coding processing is performed on the missing image using a conventional image coding method such as JPEG or HEVC. Accordingly, in the image coding processing, coded data of the missing image is obtained (step S303).

In image decoding processing, a decoded missing image is obtained from the coded data of the missing image (step S304).

In missing region information decoding processing, missing region information is obtained from the coded data of the missing region information (step S305).

In image interpolation processing, the decoded missing image and missing region information are input to the interpolation network according to the conventional technique 1, and an ultimate output image is obtained. Note that a processing unit of the coding processing and the decoding processing may be the entire picture plane, or may be a block obtained by dividing the picture plane using a structure such as a CTU of HEVC (step S306).

[Example of Configuration of Coding Device and Decoding Device]

Figure 8:
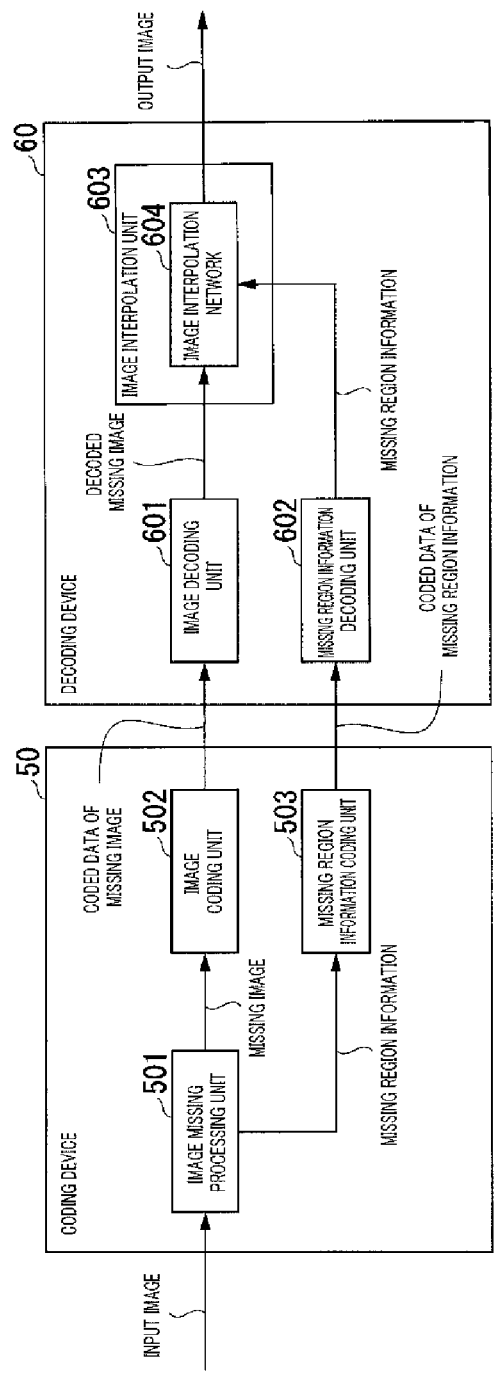
FIG. 8 is a block diagram showing functional configurations of the coding device 50 and the decoding device 60 according to the conventional technique.

Examples of configurations of a coding device 50 and a decoding device 60 for realizing the above-described coding processing and decoding processing are shown in FIG. 8. As shown in FIG. 8, the coding device 50 includes an image missing processing unit 501, an image coding unit 502, and a missing region information coding unit 503.

The image missing processing unit 501 performs image missing processing upon input of an input image. Accordingly, the image missing processing unit 501 outputs a missing image and missing region information.

The image coding unit 502 performs image coding processing upon input of the missing image. Accordingly, the image coding unit 502 outputs coded data of the missing image.

The missing region information coding unit 503 performs missing region information coding processing upon input of the missing region information. Accordingly, the missing region information coding unit 503 outputs coded data of the missing region information.

The coded data of the missing image and the coded data of the missing region information are transmitted to the decoding device 60.

As shown in FIG. 8, the decoding device 60 includes an image decoding unit 601, a missing region information decoding unit 602, and an image interpolation unit 603.

The image decoding unit 601 performs image decoding processing upon input of the coded data of the missing image. Accordingly, the image decoding unit 601 obtains a decoded missing image.

The missing region information decoding unit 602 performs missing region information decoding processing upon input of the coded data of the missing region information. Accordingly, the missing region information is obtained.

The image interpolation unit 603 includes an image interpolation network 604, and performs image interpolation processing upon input of the decoded missing image and the missing region information. Accordingly, the image interpolation unit 603 obtains an ultimate output image.

In the above-described configuration, in the image interpolation processing, the subjective image quality of an output image largely depends on the area of a missing region of a missing image. Specifically, the larger the area a missing region to be interpolated has, the smaller the amount of information to be input to the interpolation network is, and thus it is difficult to estimate a missing region in the image interpolation processing, resulting in a degradation in the subjective image quality of an output image. Furthermore, in the above-described configuration, if the missing region to be interpolated contains a complicated element that cannot be estimated based on a referenceable region, the missing region cannot be reconfigured on the decoding side, or the subjective image quality of an output will degrade.

Therefore, there are demands for a coding method and a decoding method that include image interpolation processing that can be executed, even if the area of a missing region is large or a missing region is complicated, while suppressing degradation of the subjective image quality, as well as an efficient learning method for a network that serves as a constituent element.

Hereinafter, the third embodiment of the present invention will be described using a convolution neural network, taking learning of a generative adversarial network using a discriminative network as an example. However, the present invention is not limited to image interpolation using a convolution neural network and learning in the framework of a generative adversarial network. In other words, any learning model with which an image interpolation method can be obtained through learning can be applied to the image interpolation. Furthermore, a learning method using a suitable error function can be applied to this learning method.

In the third embodiment, the coding device performs character extraction with reference to an original image, and transmits, to the decoding device, image interpolation auxiliary information for assisting image interpolation. The decoding device performs image interpolation using the image interpolation auxiliary information. Furthermore, networks used for extraction of image interpolation auxiliary information and for image interpolation are optimized individually for each network, and then the networks are coupled to each other and are optimized as a whole.

[Flows of Coding Processing and Decoding Processing]

First, a summary of coding processing and decoding processing using an interpolation network and an auxiliary information extraction network according to the present invention will be described.

Figure 9:
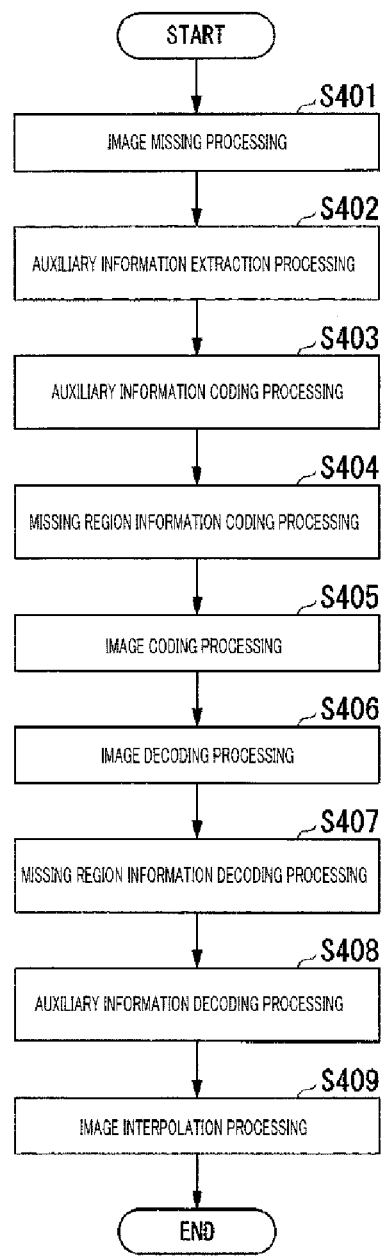
FIG. 9 is a flowchart showing a flow of processing performed by a coding device 70 and a decoding device 80 according to a third embodiment.

FIG. 9 shows a flow of the coding processing and the decoding processing according to the third embodiment.

In image missing processing, a region to be reconfigured through image interpolation on the decoding side is selected from an input image. In the image missing processing, this region is rendered missing by, for example, processing for replacing the region with an average, so that a missing image is generated. In the image missing processing, the generated missing image is output together with missing region information that indicates the position of a missing region, which is an aggregation of pixel values of the missing region.

Here, as the missing region information, for example, a binary mask image (hereinafter, referred to as a missing region mask image) indicating the missing region can be used. Furthermore, as the method for selecting a region in the image missing processing, a method for selecting a region that has a larger amount of coding that occurs when a fixed quantization level in HEVC intra coding is used, a method for executing region division for each object used in image recognition and selecting the divided region as a region to be interpolated, or the like can be used (step S401).

In auxiliary information extraction processing, image interpolation auxiliary information is extracted from a region of the input image that corresponds to the missing region derived from the missing region information, or the input image itself, using a network for extracting image interpolation auxiliary information (step S402). The network for extracting image interpolation auxiliary information will be described in detail later.

In auxiliary information coding processing, the image interpolation auxiliary information extracted in the auxiliary information extraction processing is coded using a conventional entropy coding method such as the Huffman coding. Accordingly, in the auxiliary information coding processing, coded data of the image interpolation auxiliary information is obtained (step S403).

In missing region information coding processing, processing for coding the region to be reconfigured in order to transmit the missing region information to the decoding side is performed using a conventional image coding method such as JPEG or HEVC, or an entropy coding method such as the run-length coding. Accordingly, in the missing region information coding processing, coded data of the missing region information is obtained (step S404).

In image coding processing, coding processing is performed on the missing image using a conventional image coding method such as JPEG or HEVC. Accordingly, in the image coding processing, coded data of the missing image is obtained (step S405).

In image decoding processing, a decoded missing image is obtained from the coded data of the missing image (step S406).

In missing region information decoding processing, missing region information is obtained from the coded data of the missing region information (step S407).

In auxiliary information decoding processing, image interpolation auxiliary information is obtained from the coded data of the image interpolation auxiliary information (step S407).

In image interpolation processing, the decoded missing image, the missing region information, and the image interpolation auxiliary information are input to a network for image interpolation, and an ultimate output image is obtained. The network for image interpolation will be described in detail later (step S408).

Note that processing unit of the coding processing and the decoding processing may be the entire picture plane, or may be a block obtained by dividing the picture plane using a structure such as a CTU of HEVC.

[Example of Configuration of Coding Device and Decoding Device]

Figure 10:
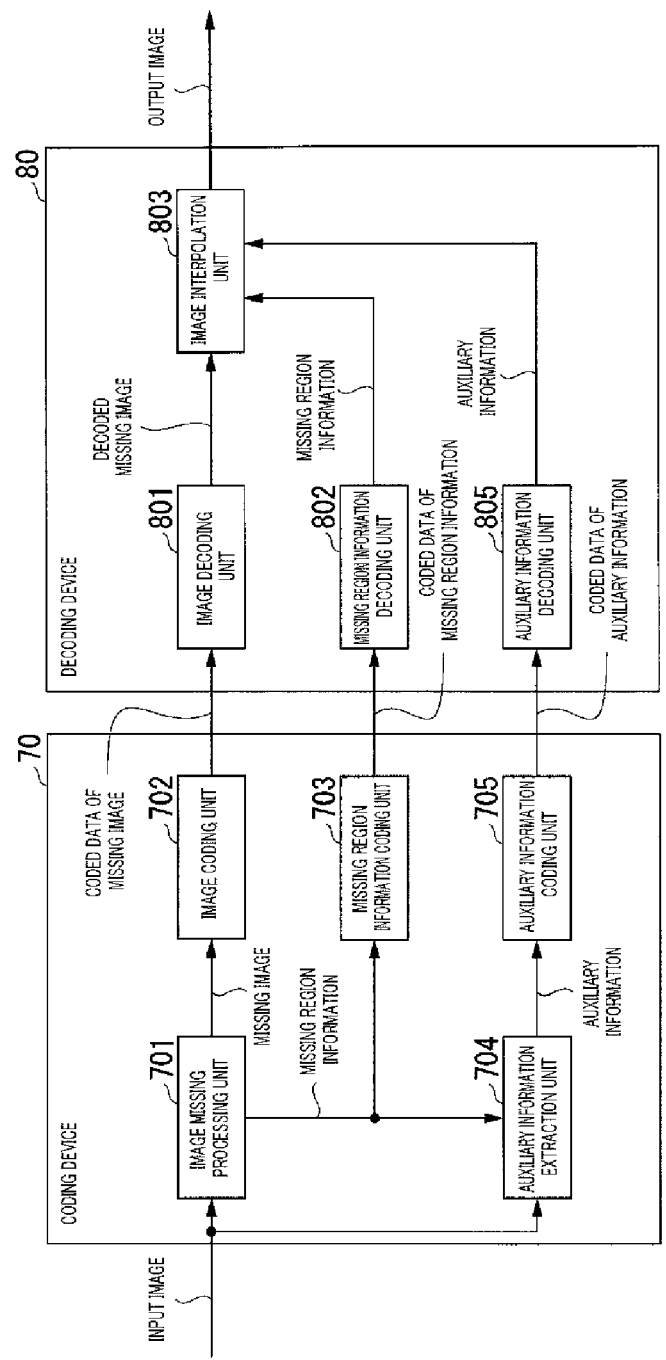
FIG. 10 is a block diagram showing functional configurations of the coding device 70 and the decoding device 80 according to the third embodiment.

In the following, examples of configurations of a coding device and a decoding device for realizing the above-described coding processing and decoding processing are shown in FIG. 10. As shown in FIG. 10, a coding device 70 includes an image missing processing unit 701, an image coding unit 702, a missing region information coding unit 703, an auxiliary information extraction unit 704, and an auxiliary information coding unit 705.

The image missing processing unit 701 performs image missing processing upon input of an input image. Accordingly, the image missing processing unit 701 outputs a missing image and missing region information.

The image coding unit 702 performs image coding processing upon input of the missing image. Accordingly, the image coding unit 702 outputs coded data of the missing image.

The missing region information coding unit 703 performs missing region information coding processing upon input of the missing region information. Accordingly, the missing region information coding unit 703 outputs coded data of the missing region information.

The auxiliary information extraction unit 704 performs auxiliary information extraction processing upon input of a region of the input image that corresponds to the missing region derived from the missing region information, or the entire image including the region that is not the missing region. Accordingly, the auxiliary information extraction unit 704 extracts image interpolation auxiliary information.

The auxiliary information coding unit 705 performs auxiliary information coding processing upon input of the image interpolation auxiliary information. Accordingly, the auxiliary information coding unit 705 outputs coded data of the image interpolation auxiliary information.

The coded data of the missing image, the coded data of the missing region information, and the coded data of the image interpolation auxiliary information are transmitted to a decoding device 80.

As shown in FIG. 10, the decoding device 80 includes an image decoding unit 801, a missing region information decoding unit 802, an image interpolation unit 803, and an auxiliary information decoding unit 805.

The image decoding unit 801 performs image decoding processing upon input of the coded data of the missing image. Accordingly the image decoding unit 801 obtains a decoded missing image.

The missing region information decoding unit 802 performs missing region information decoding processing upon input of the coded data of the missing region information. Accordingly, the missing region information decoding unit 802 obtains the missing region information.

The auxiliary information decoding unit 805 performs auxiliary information decoding processing upon input of the coded data of the image interpolation auxiliary information. Accordingly, the auxiliary information decoding unit 805 obtains the image interpolation auxiliary information.

The image interpolation unit 803 performs, upon input of the decoded missing image, the missing region information, and the image interpolation auxiliary information, image interpolation processing with reference to the image interpolation auxiliary information. Accordingly, the image interpolation unit 803 obtains an ultimate output image.

[Configurations of Auxiliary Information Extraction Unit and Image Interpolation Unit, and Learning Method]

The following will describe configurations of the auxiliary information extraction unit 704 and the image interpolation unit 803, and a learning method.

Figure 11:
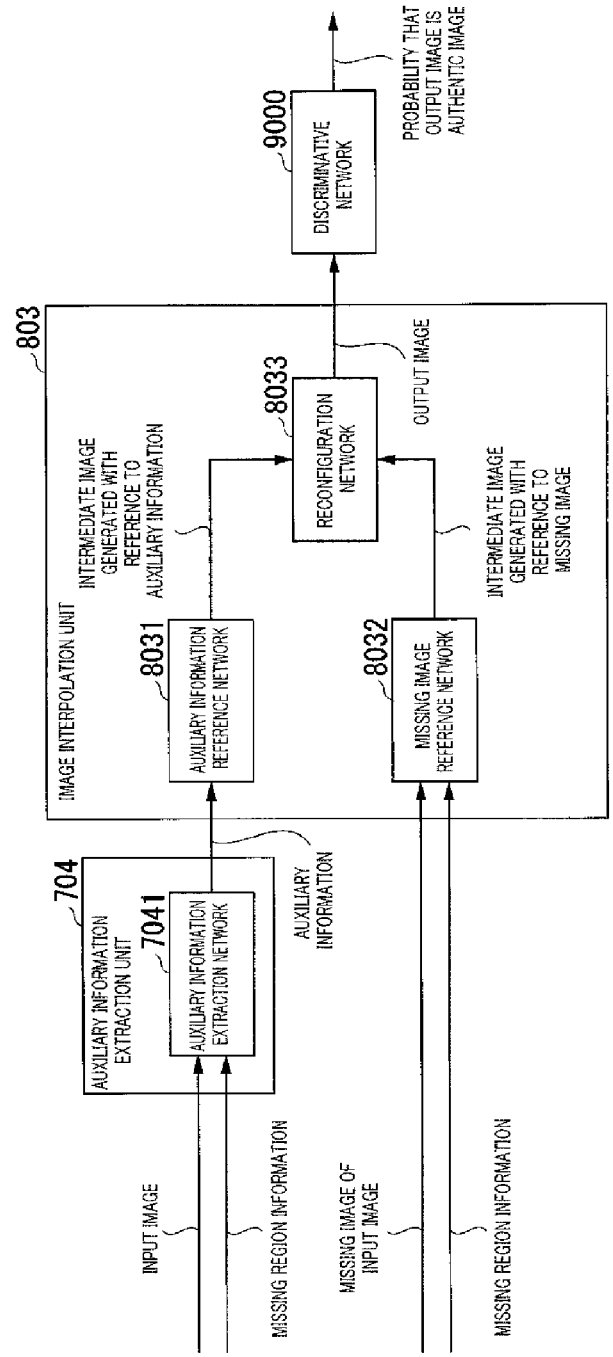
FIG. 11 is a block diagram showing configurations of networks of the coding device 70 and the decoding device 80 according to the third embodiment.

Configurations of networks of the auxiliary information extraction unit 704 and the image interpolation unit 803 are shown in FIG. 11. As shown in FIG. 11, the auxiliary information extraction unit 704 is constituted by an auxiliary information extraction network 7041 for extracting image interpolation auxiliary information to be transmitted to the decoding side.

The auxiliary information extraction network 7041 is a network that receives inputs of an input image and missing region information, and outputs image interpolation auxiliary information. The auxiliary information extraction network 7041 forms an intermediate layer with a convolution layer, a fully connected layer, and the like, for example, by receiving two images, namely, an input image and a missing region mask image and outputting a suitable number of units.

As shown in FIG. 11, the image interpolation unit 803 includes an auxiliary information reference network 8031 for predicting a missing region with reference to the image interpolation auxiliary information, a missing image reference network 8032 for predicting a missing region with reference to a missing image, and a reconfiguration network 8033 for generating an ultimate interpolated image based on outputs from the above-described two networks.

The auxiliary information reference network 8031 is a network that receives an input of image interpolation auxiliary information, and outputs an intermediate image generated with reference to the auxiliary information. The auxiliary information reference network 8031 forms an intermediate layer with a fully connected layer, an inverse convolution layer, a convolution layer, and the like, for example, by receiving the same number of units as the number of pieces of image interpolation auxiliary information, and outputting a single intermediate image generated with reference to the auxiliary information.

The missing image reference network 8032 is a network that receives an input of a missing image of the input image and a missing region mask image, and outputs an intermediate image generated with reference to the missing image. The missing image reference network 8032 forms an intermediate layer with a convolution layer, a fully connected layer, and an inverse convolution layer, and the like, for example, by receiving two images, namely, a missing image and a missing region mask image of an input image, and outputting a single intermediate image generated with reference to the missing image.

The reconfiguration network 8033 is a network that receives inputs of the intermediate image generated with reference to the auxiliary information and the intermediate image generated with reference to the missing image, and outputs an ultimate output image in which the missing region has been interpolated. The reconfiguration network 8033 forms an intermediate layer with a convolution layer, a fully connected layer, an inverse convolution layer, and the like, for example, by receiving inputs of two intermediate images and outputting a single output image.

With the above-described configuration, the auxiliary information extraction unit 704 and the image interpolation unit 803 perform learning. Similar to the conventional technique 1, the framework of the generative adversarial network can be used during the learning. At this time, similar to the conventional technique 1, a discriminative network 9000 for evaluating the authenticity of the interpolated region receives an input of an image output from the image interpolation unit 803, and outputs the probability that the output image is a non-interpolated authentic image.

The following will describe a learning method of a network using the configuration shown in FIG. 11. In the learning processing, multiple sets of an original image, a missing image of the original image generated by adding missing regions to the original image in a random manner, and missing region information are provided as training data. As an error function for use in learning, for example, any of a pixel mean square error between the original image and an image output from a network (hereinafter, referred to as "mean square error"), an error (hereinafter, referred to as "discriminative network error") that employs the framework of the generative adversarial network, and an image output from the network is identified by a discriminative network, and an error (hereinafter, referred to as "weighted error") using a weighted sum of the mean square error and the discriminative network error can be used.

[Learning Method for Network]

Figure 12:
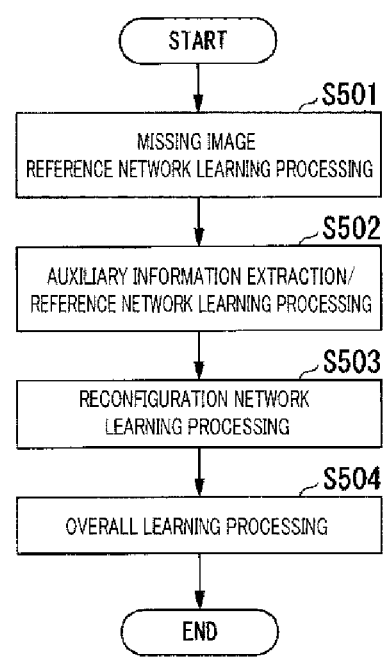
FIG. 12 is a flowchart showing a flow of learning processing performed by the coding device 70 and the decoding device 80 according to the third embodiment.

FIG. 12 shows a flow of learning processing.

Figure 13:
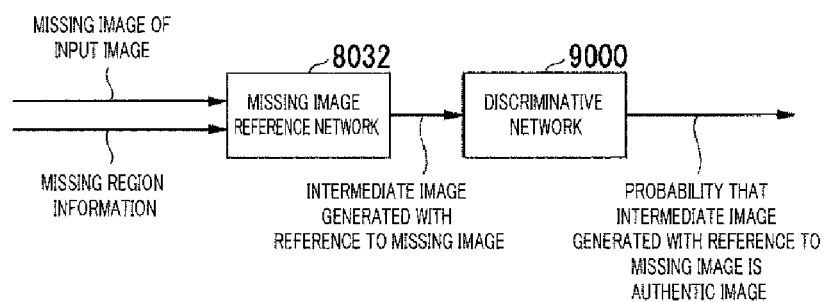
FIG. 13 is a block diagram showing configurations of networks of a missing image reference network learning processing according to the third embodiment.

In missing image reference network learning processing, the missing image reference network 8032 and the discriminative network 9000 shown in FIG. 11 are extracted, and are coupled to each other as shown in FIG. 13, and an output from the missing image reference network 8032 is regarded as an input to the discriminative network 9000, and thereby the missing image reference network 8032 is trained (step S501).

Specifically, in the missing image reference network learning processing, a missing image of an original image and missing region information are input to the missing image reference network 8032, and parameters of the network are updated using an error backpropagation method so that an image to be output approaches the original image. Here, in the missing image reference network learning processing, first, learning is performed using a mean square error as an error function, and then learning is performed using a weighted error as an error function. Similarly, also in the next network learning processing and onward, a mean square error is used for learning, and then a weighted error is used for learning.

Figure 14:
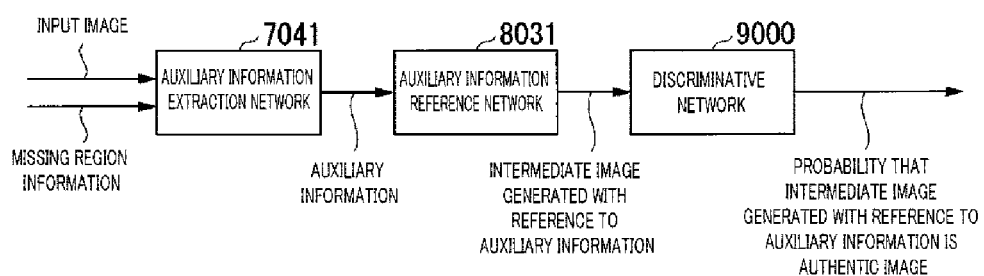
FIG. 14 is a block diagram showing configurations of networks of the coding device 70 and the decoding device 80 according to a fourth embodiment.

In auxiliary information extraction/reference network learning processing, the auxiliary information extraction network 7041, the auxiliary information reference network 8031, and the discriminative network 9000 shown in FIG. 11 are extracted, and are coupled to each other as shown in FIG. 14, and an output from the auxiliary information reference network 8031 is regarded as an input to the discriminative network 9000, and thereby the auxiliary information extraction network 7041 and the auxiliary information reference network 8031 are trained (step S502).

Specifically, in the auxiliary information extraction/reference network learning processing, the original image and the missing region information are input to a network in which the auxiliary information extraction network 7041 and the auxiliary information reference network 8031 are coupled to each other. In the auxiliary information extraction/reference network learning processing, a mean square error and a weighted error are applied in the stated order, and parameters of the network are updated using an error backpropagation method so that an image to be output approaches the original image.

In reconfiguration network learning processing, the missing image reference network 8032, the auxiliary information extraction network 7041, the auxiliary information reference network 8031, the reconfiguration network 8033, and the discriminative network 9000 that are constructed in the missing image reference network learning processing and the auxiliary information extraction/reference network learning processing are coupled to each other as shown in FIG. 11, and only the reconfiguration network 8033 is trained (step S503).

Specifically, in the reconfiguration network learning processing, the original image, the missing image of the original image, and the missing region information are input to the coupled networks, and a mean square error and a weighted error are applied in the stated order, and only parameters of the reconfiguration network are updated using an error backpropagation method, so that an image to be output approaches the original image.

In overall learning processing, the missing image reference network 8032, the auxiliary information extraction network 7041, the auxiliary information reference network 8031, and the reconfiguration network 8033 that are coupled to each other as shown in FIG. 11 in the reconfiguration network learning processing are simultaneously trained (step S504).

Specifically, in the overall learning processing, the original image, the missing image of the original image, and the missing region information are input to the coupled networks, and a mean square error and a weighted error are applied in the stated order, and parameters of the overall networks are updated using an error backpropagation method, so that an image to be output approaches the original image.

Note that a configuration is also possible in which only the auxiliary information extraction network learns fixed network parameters.

Note that the order in which the above-described error functions are applied is given as an example, and learning may be performed without using the framework of the generative adversarial network including the discriminative network 9000, and a discriminative network error, a mean square error, and a weighted error may be applied while being suitably changed depending on the number of repetition of the learning.

Furthermore, if learning is performed using the framework of the generative adversarial network, a configuration is also possible in which, independent from the learning processing of the networks shown in FIG. 12, the discriminative network 9000 is trained according to the number of repetitions or the accuracy rate of the discriminative network 9000.

In the learning of the discriminative network 9000, it is sufficient that, for example, the output image and the original image of the networks that are used in each step of the learning processing shown in FIG. 12 are alternately input to the discriminative network 9000 to cause the discriminative network 9000 to output the probability that the inputs correspond to the original image, and an error between the output and the correct value of 0 or 1 is evaluated using an error function such as mutual information content, and parameters are updated using an error backpropagation method.

Furthermore, completion of the pieces of the learning processing may be determined using a threshold processing with respect to the number of repetitions or a decrease in the error. Note that a processing unit of the processing may be the entire picture plane, or may be a block obtained by dividing the picture plane using a structure such as a CTU of HEVC.

As described above, the coding method and the decoding method of the third embodiment perform image generation using image interpolation auxiliary information, in contrast to a method according to a conventional technique in which an interpolation network is applied to the decoding side to generate an image, thereby obtaining an output image. Accordingly, the coding method and the decoding method of the third embodiment can improve the prediction accuracy relative to methods using conventional techniques, and can realize generation using the features of an original image.

Furthermore, in the coding method and the decoding method of the third embodiment, image interpolation auxiliary information to be transmitted can be determined through learning, and thus it is possible to extract image interpolation auxiliary information with which a more accurate reconfiguration result can be obtained than image interpolation auxiliary information manually determined through trial and error as in the conventional HEVC. Furthermore, in the coding method and the decoding method of the third embodiment, by controlling the network learning order or error functions to be applied, the complicated networks to be trained can achieve an intended operation.

In the above-described conventional technique 1, a method for obtaining an image interpolation network through learning has been proposed, and if this interpolation network is applied to the decoding side of the framework of image coding, the accuracy of generation will be reduced, when particularly large area is to be interpolated or when a region to be interpolated is complicated to the extent that it cannot be estimated based on the surrounding area.

On the other hand, in the coding method and the decoding method of the third embodiment, the above-described problem is solved by providing the auxiliary information extraction unit 704 on the coding side, and giving image interpolation auxiliary information to the interpolation network. Also, at this time, the auxiliary information extraction network 7041 that defines the image interpolation auxiliary information is obtained through learning, and thus the coding method and the decoding method of the third embodiment can extract image interpolation auxiliary information with which a more accurate image generation is realized than image interpolation auxiliary information manually designed as in image coding such as HEVC.

In the configurations of the coding method and the decoding method of the third embodiment, network parameters are obtained through learning by the components including the auxiliary information extraction unit 704 that generates image interpolation auxiliary information, and thus when the auxiliary information extraction unit 704 and the image interpolation unit 803 are simultaneously trained, it is difficult for each of the networks to learn an intended operation. Particularly, if the framework of the generative adversarial network is used, adjustment of learning is difficult and thus this tendency is noticeable.

However, in the coding method and the decoding method of the third embodiment, the auxiliary information extraction unit 704 and the image interpolation unit 803 are divided into networks having respective functions, and by controlling a network to be trained and an error function to be applied based on the number of repetitions of learning, each of the networks can achieve an intended operation.

Fourth Embodiment

The following will describe a fourth embodiment with reference to the drawings.

The fourth embodiment differs from the third embodiment in the configurations of networks of the auxiliary information extraction unit and the image interpolation unit, and relates to generation of image interpolation auxiliary information based on a difference between an output of a missing image reference network and an input image.

Figure 15:
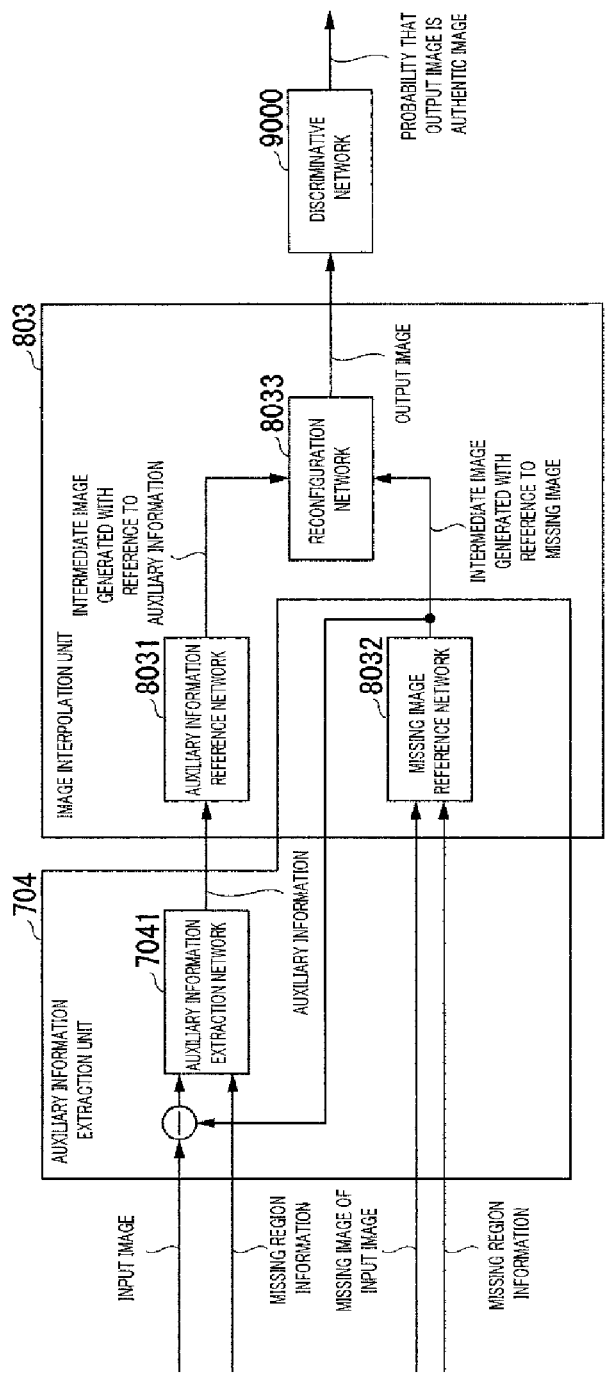
FIG. 15 is a block diagram showing configurations of networks of the coding device 70 and the decoding device 80 according to the fourth embodiment.

The configurations of the networks of the fourth embodiment are shown in FIG. 15. As shown in FIG. 15, the auxiliary information extraction unit 704 is constituted by the auxiliary information extraction network 7041 and the missing image reference network 8032 that uses network parameters common to the image interpolation unit 803.

The auxiliary information extraction network 7041 is a network that receives inputs of a difference between an input image and an intermediate image generated with reference to a missing image, and missing region information, and outputs image interpolation auxiliary information. The auxiliary information extraction network 7041 forms an intermediate layer with a convolution layer, a fully connected layer, and the like, for example, by receiving inputs of two images, namely, a difference image between an input image and an intermediate image generated with reference to a missing image, and a missing region mask image, and outputting a suitable number of units.

As shown in FIG. 15, the image interpolation unit 803 is constituted by the auxiliary information reference network 8031, the missing image reference network 8032, and the reconfiguration network 8033.

These networks have the same inputs and outputs as those in the third embodiment except for the missing image reference network 8032.

The auxiliary information reference network 8031 is a network that receives an input of the image interpolation auxiliary information, and outputs an intermediate image generated with reference to the auxiliary information.

The missing image reference network 8032 is a network that receives an input of a missing image of an input image and a missing region mask image, and outputs an intermediate image generated with reference to the missing image.

The intermediate image generated with reference to the missing image is input to the reconfiguration network 8033, which is a constituent element of the image interpolation unit 803. Furthermore, a difference between the intermediate image generated with reference to the missing image and the input image is input to the auxiliary information extraction network 7041, which is a constituent element of the auxiliary information extraction unit 704.

The reconfiguration network 8033 is a network that receives an input of the intermediate image generated with reference to the auxiliary information, and the intermediate image generated with reference to the missing image, and outputs an ultimate output image in which the missing region is interpolated.

With the above-described configuration, learning of the auxiliary information extraction unit 704 and the image interpolation unit 803 is performed.

Figure 16:
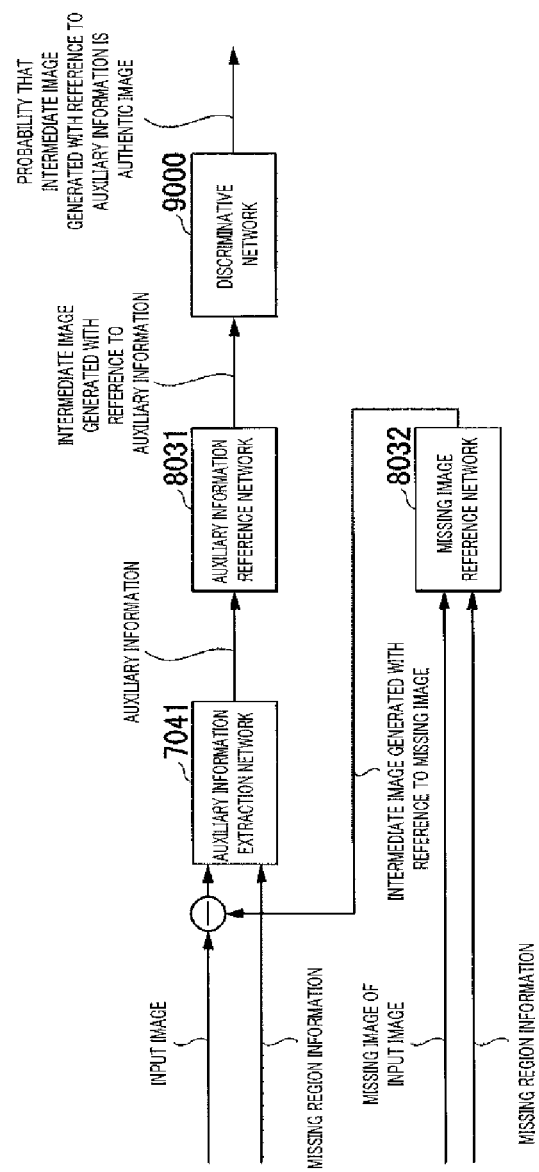
FIG. 16 is a block diagram showing configurations of networks of auxiliary information extraction/reference network learning processing according to the fourth embodiment.

Note that the learning processing is the same as that in the third embodiment, but the configurations of the networks in the auxiliary information extraction/reference network learning processing is as shown in FIG. 16. In this processing, only learning of the auxiliary information extraction network 7041 and the auxiliary information reference network 8031 is performed using the configuration shown in FIG. 16.

As described above, the auxiliary information extraction unit 704 according to the fourth embodiment can receive a direct input of an original image as in the third embodiment, but can also receive an input of a difference image between the original image and an image predicted based on surrounding blocks, on the assumption that, as described above, the prediction result based on the surrounding blocks (intermediate image generated with reference to a missing image) is shared between the decoding side and the coding side. Accordingly, it is possible to explicitly introduce a restriction that an output image of the image interpolation unit 803 is not too different from an original image, leading to an improvement in the subjective quality of an interpolation result.

Part or whole of the coding device and the decoding device according to the above-described embodiments may be realized by a computer. In this case, the realization may also be achieved by storing a program for realizing functions thereof into a computer-readable recording medium, causing a computer system to read the program recorded in this recording medium and to execute the read program. Note that "computer system" in this context is assumed to include hardware such as an OS and a peripheral device. Furthermore, "computer-readable recording medium" refers to a portable medium such as a flexible disk, a magneto optical disk, a ROM, and a CD-ROM, or a storage device such as a hard disk built in the computer system. Furthermore, "computer-readable recording medium" may include a medium that dynamically stores a program for a short period of time, such as a communication wire used when the program is transmitted via a network such as the Internet or a communication line such as telephone line, and a medium that stores a program for a certain period of time, such as a volatile memory provided inside the computer system that serves as a server or a client in this case. Furthermore, the above-described program may be a program for realizing some of the above-described functions, and may also be a program that can realize the above-described function together with another program recorded in the computer system, and may be realized using a programmable logic device such as a Field Programmable Gate Array (FPGA).

The above-described embodiments of the present invention have been described in detail with reference to the drawings, but the present invention is not limited to these embodiments and encompasses designs without departing from the spirit of the present invention, and the like.

REFERENCE SIGNS LIST 10, 30 Coding device
101, 301 Block dividing unit
102, 302 Coding method determination unit
103, 303 Auxiliary information extraction unit
104, 304 Auxiliary information entropy coding unit
105, 305 Image transformation unit
306 Transformed image memory
107, 307 Intra prediction unit
108, 308 Transformation/quantization unit
109, 309 Entropy coding unit
110, 310 Inverse quantization/inverse transformation unit
111, 311 Prediction memory
20 Decoding device
201, 401 Entropy decoding unit
202, 402 Inverse transformation/inverse quantization unit
203, 403 Intra prediction unit
204, 404 Prediction memory
205, 405 Reconfiguration unit
206, 406 Coding method determination unit
207, 407 Auxiliary information entropy decoding unit
408 Output picture memory
50, 70 Coding device
501, 701 Image missing processing unit
502, 702 Image coding unit
503, 703 Missing region information coding unit
704 Auxiliary information extraction unit
7041 Auxiliary information extraction network
705 Auxiliary information coding unit
60, 80 Decoding device
601, 801 Image decoding unit
602, 802 Missing region information decoding unit
603, 803 Image interpolation unit
8031 Auxiliary information reference network
8032 Missing image reference network
8033 Reconfiguration network
604 Image interpolation network
805 Auxiliary information decoding unit
9000 Discriminative network

The invention claimed is:

1. A coding device for coding an image, comprising: a processor; and a storage medium having computer program instructions stored thereon, when executed by the processor, perform to acquire a region of a first image that matches a predetermined condition; acquire a second image by associating the first image, the acquired region, and a region obtained by removing the acquired region from the first image with each other; and code the second image; an auxiliary information extraction network configured to receive inputs of the first image and the acquired region, and output auxiliary information, which is information for assisting image interpolation; an auxiliary information reference network configured to receive an input of the auxiliary information, and output a first intermediate image generated with reference to the auxiliary information; a missing image reference network configured to receive inputs of the acquired region and the region obtained by removing the acquired region, and output a second intermediate image generated with reference to a missing image; and a reconfiguration network configured to receive inputs of the first intermediate image and the second intermediate image, and output the second image.

2. The coding device according to claim 1, wherein the missing image reference network learns learning parameters for the second intermediate image so that a pixel difference between the second intermediate, image and the first image is minimized.

3. The coding device according to claim 1, wherein the auxiliary information extraction network learns learning parameters for the auxiliary information so that a pixel difference between the first intermediate image output from the auxiliary information reference network and the first image is minimized.

4. The coding device according to claim 1, wherein the auxiliary information reference network learns learning parameters for the first intermediate image so that a pixel difference between the first intermediate image and the first image is minimized.

5. A coding device for coding an image, comprising: a processor; and a storage medium having computer program instructions stored thereon, when executed by the processor, perform to acquire a region of a first image that matches a predetermined condition; acquire a second image by associating the first image, the acquired region, and a region obtained by removing the acquired region from the first image with each other; and code the second image; an auxiliary information extraction network configured to receive inputs of a difference image between the first image and a second intermediate image output from a missing image reference network, and the acquired region, and output auxiliary information, which is information for assisting image interpolation; an auxiliary information reference network configured to receive an input of the auxiliary information, and output a first intermediate image generated with reference to the auxiliary information; the missing image reference network configured to receive inputs of the acquired region, and the region obtained by removing the acquired region, and output the second intermediate image generated with reference to a missing image; and a reconfiguration network configured to receive inputs of the first intermediate image and the second intermediate image, and output the second image.

6. The coding device according to claim 5, wherein the missing image reference network learns learning parameters for the second intermediate image so that a pixel difference between the second intermediate image and the first image is minimized.

7. The coding device according to claim 5, wherein the auxiliary information extraction network learns learning parameters for the auxiliary information so that a pixel difference between the first intermediate image output from the auxiliary information reference network and the first image is minimized.

8. The coding device according to claim 5, wherein the auxiliary information reference network learns learning parameters for the first intermediate image so that a pixel difference between the first intermediate image and the first image is minimized.

* * * * *